United States Patent
Mohaideen P et al.

(10) Patent No.: US 9,858,265 B1
(45) Date of Patent: Jan. 2, 2018

(54) SYSTEMS AND METHODS FOR DETERMINING CONTEXT SWITCHING IN CONVERSATION

(71) Applicant: Rovi Guides, Inc., San Carlos, CA (US)

(72) Inventors: Ahmed Nizam Mohaideen P, Kovilpatti (IN); Sashikumar Venkataraman, Andover, MA (US); Manik Malhotra, Bengaluru KA (IN)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 15/176,516

(22) Filed: Jun. 8, 2016

(51) Int. Cl.
  *G06F 17/27* (2006.01)
  *G10L 15/16* (2006.01)
  *G06F 17/30* (2006.01)

(52) U.S. Cl.
  CPC .......... *G06F 17/279* (2013.01); *G06F 17/277* (2013.01); *G06F 17/30401* (2013.01); *G06F 17/30554* (2013.01); *G10L 15/16* (2013.01)

(58) Field of Classification Search
  CPC ............. G06F 17/279; G06F 17/30554; G06F 17/30401; G06F 17/277; G10L 15/16
  See application file for complete search history.

(56) References Cited

U.S. PATENT DOCUMENTS

| | | |
|---|---|---|
| 9,183,257 B1 | 11/2015 | Buchanan et al. |
| 9,189,742 B2 | 11/2015 | London |
| 2012/0096030 A1 | 4/2012 | Kim |
| 2014/0365209 A1* | 12/2014 | Evermann ............. G06F 17/279 704/9 |
| 2015/0066479 A1* | 3/2015 | Pasupalak ............... G06F 17/27 704/9 |
| 2015/0142420 A1* | 5/2015 | Sarikaya ............... G06F 17/279 704/9 |
| 2016/0092434 A1* | 3/2016 | Bellegarda ............ G06F 17/279 704/9 |
| 2016/0188565 A1* | 6/2016 | Robichaud ............ G06F 17/278 704/9 |
| 2016/0358240 A1* | 12/2016 | Redfern ............. G06Q 30/0619 |

\* cited by examiner

*Primary Examiner* — Qian Yang
(74) *Attorney, Agent, or Firm* — Haley Guiliano LLP

(57) ABSTRACT

Systems and methods are described to address shortcomings in a conventional conversation system via a novel technique utilizing artificial neural networks to train the conversation system whether or not to continue context. In some aspects, an interactive media guidance application determines a type of conversation continuity in a natural language conversation comprising first and second queries. The interactive media guidance application determines a first token in the first query and a second token in the second query. The interactive media guidance application identifies entity data for the first and second tokens. The interactive media guidance application retrieves, from a knowledge graph, graph connections between the entity data for the first and second tokens. The interactive media guidance application applies this data as inputs to an artificial neural network. The interactive media guidance application determines an output that indicates the type of conversation continuity between the first and second queries.

20 Claims, 10 Drawing Sheets

SYSTEMS AND METHODS FOR DETERMINING CONTEXT SWITCHING IN CONVERSATION

BACKGROUND

Context maintenance or switching is an important decision to be made by any conversation system. For example, for a query "show me action movies" followed by another query "with Tom Cruise," the conversation system is expected to maintain context across the queries. But if the second query was "how about some comedy," then the conversation system is expected to switch context. The conventional approach to solve this problem is to have a set of rules that determine whether the subsequent query is connected to the first query. However, rule-based systems are rigid and need programmers to be involved to address every possible situation that may arise during a natural language conversation.

SUMMARY

Systems and methods are described to address shortcomings in a conventional conversation system via a novel technique utilizing artificial neural networks to train the conversation system whether or not to continue context. In some aspects, in an interactive media guidance application, a user may request media assets via a natural language query. The interactive media guidance application may include a conversation system to process the natural language query. The conversation system may be trained using an artificial neural network to determine whether to continue context or not across queries. At the input layer, the artificial neural network may be fed with examples of previous and next queries. An initial layer may be optionally added to filter common or filler words, e.g., articles, and consider only words that can act as potential features. All the words and phrases in the previous and next queries are then considered as potential features. Furthermore, the entities in the queries may be replaced by the entity type. For example, "movies with Tom Cruise" may be replaced with "movies with." In this way, a particular example can be representative of a whole class of queries.

In some embodiments, the training of the artificial neural network involves feeding multiple examples of previous-next queries where context is preserved and feeding multiple examples of previous-next queries where context is not preserved. The number of hidden layers can be a parameter that can be used to control the accuracy of the artificial neural network. Once the artificial neural network is trained, it can be used to detect context switching in real user queries. One advantage of this method is the ability to continuously train the network with more examples whenever it fails so that it may learn all possible situations over time. For example, the user may provide feedback when the network fails to detect a context switch or indicates a context switch where none exists.

In some aspects, an interactive media guidance application, implemented on control circuitry, receives a first query and a second query. For example, the interactive media guidance application may receive a first query, "movies of Tom Cruise," and a second query, "with Nicole Kidman." The interactive media guidance application isolates each query into a plurality of tokens. For example, the interactive media guidance application may isolate the first query into tokens "movies of" and "Tom Cruise" and the second query into tokens "with" and "Nicole Kidman." For each token, the interactive media guidance application determines possible entity types for the token and probability of the token belonging to that entity type. For example, the interactive media guidance application may determine a possible entity type "Actor" for token "Tom Cruise" and probability of the token belonging to the entity type to be 0.99 and another possible entity type "Location" and probability of the token belonging to the entity type to be 0.01. The interactive media guidance application may determine possible entity type "Actor" for token "Nicole Kidman" and probability of the token belonging to the entity type to be 1.

For each pair of possible entity types across tokens, the interactive media guidance application retrieves graph connections for the pairs of possible entity types. The interactive media guidance application applies this data to inputs of an artificial neural network. The interactive media guidance application receives an output indicating conversation continuity between the first and second query and a type of the conversation continuity. For example, the interactive media guidance application may receive an output indicating that there is a merge type of conversation continuity between the first query and the second query. The interactive media guidance application updates the second query based on the output. For example, the interactive media guidance application may update the second query by merging the second query with the first query, i.e., "movies of Tom Cruise with Nicole Kidman." The interactive media guidance application receives results for the second query.

In some embodiments, the features that are provided as input into the artificial neural network include words/tokens of the previous and current query, probabilities of the entity types each token refers to (e.g., R may refer to an R rating as well a movie named "R"), graph connections between the various entities, and other suitable features. The features are fed as different inputs to the network. The network may have one or more hidden layers to then create the output that denotes a multi-class denoting the type of conversation continuity.

For example, one type of conversation continuity is merge continuity. In such situations, the previous and next queries are merged where the next query is a continuation of the previous query. An exemplary set of previous and next queries may be "movies of Tom Cruise" and "with Nicole Kidman." Another exemplary set of previous and next queries may be "get me some good Sci-Fi movies" and "on NETFLIX." Yet another exemplary set of previous and next queries may be "looking for Tom Cruise flicks" and "interested in the ones with Nicole Kidman."

For example, another type of conversation continuity is replacement continuity. In such situations, a portion of the previous query is replaced with a portion of the next query. An exemplary set of previous and next queries may be "is there any Red Sox game tonight" and "how about tomorrow." In this situation, "tomorrow" from the next query replaces "tonight" in the previous query.

For example, another type of conversation continuity is clarification continuity. In such situations, the next query clarifies an earlier entity from the previous query as opposed to adding more entities to the previous query. An exemplary set of previous and next queries may be "who won the Broncos game" and "I meant the college team." In this situation, the "I meant" feature clarifies the earlier entity in the previous query as opposed to adding more entities into the conversation. Another exemplary set of previous and next queries may be "Beethoven movies" and "I meant the dog." Similarly in this situation, the "I meant" feature clarifies the earlier entity in the previous query as opposed to adding more entities into the conversation.

In some aspects, the systems and methods described herein provide for an interactive media guidance application for determining a type of conversation continuity in a natural language conversation comprising a first query and a second query. The interactive media guidance application receives the first query from a user via a user input device. For example, the interactive media guidance application may receive a first query, "Give me some Beethoven movies." The interactive media guidance application retrieves a first search result for the first query from a database. The interactive media guidance application generates for display the first search result. For example, the interactive media guidance application may retrieve and generate for display search results "Beethoven: A Documentary" and "Beethoven Musical Genius." The interactive media guidance application receives the second query from the user via the user input device. For example, the interactive media guidance application may receive a second query, "I meant the Dog."

The interactive media guidance application determines a first token in the first query. For example, the interactive media guidance application may determine a first token "Beethoven" in the first query. In some embodiments, the interactive media guidance application determines the first token in the first query by identifying a first term and a second term in the first query, determining the first term is a filler word, determining the second term is not a filler word, and assigning the second term to be the first token. For example, the interactive media guidance application may identify "some" and "Beethoven" among other terms in the first query. The interactive media guidance application may determine "some" to be a filler word and "Beethoven" to be not a filler word. The interactive media guidance application may assign "Beethoven" as the first token.

The interactive media guidance application determines a second token in the second query. For example, the interactive media guidance application may determine "Dog" to be a second token in the second query. The interactive media guidance application identifies first entity data for the first token. The first entity data includes a first entity type for the first token, a first probability that the first entity type corresponds to the first token, a second entity type for the first token, and a second probability that the second entity type corresponds to the first token. For example, the interactive media guidance application may identify a first entity type "Musician" and a first probability of 0.75 and a second entity type "Dog" and a second probability of 0.25. The interactive media guidance application identifies second entity data for the second token. The second entity data includes a third entity type for the second token, a third probability that the third entity type corresponds to the second token, a fourth entity type for the second token, and a fourth probability that the fourth entity type corresponds to the second token.

The interactive media guidance application retrieves, from a knowledge graph, one or more graph connections between the first entity data and the second entity data. For example, the interactive media guidance application may retrieve a graph connection between first entity data for the first token "Beethoven" and second entity data for the second token "Dog." In some embodiments, the interactive media guidance application retrieves the one or more graph connections between the first entity data and the second entity data by retrieving a first graph connection between the first token being the first entity type and the second token being the third entity type, retrieving a second graph connection between the first token being the second entity type and the second token being the third entity type, retrieving a third graph connection between the first token being the first entity type and the second token being the fourth entity type, and retrieving a fourth graph connection between the first token being the second entity type and the second token being the fourth entity type.

The interactive media guidance application applies the first token, the second token, the first entity data, the second entity data, and the one or more graph connections as inputs to an artificial neural network. In some embodiments, the interactive media guidance application applies the first token, the second token, the first entity data, the second entity data, and the one or more graph connections as inputs to the artificial neural network by multiplying a first value for the first token with a first weight of an input layer of the artificial neural network, multiplying a second value for the second token with a second weight of the input layer of the artificial neural network, multiplying one or more values for the first entity data with one or more weights of the input layer of the artificial neural network, multiplying one or more values for the second entity data with one or more weights of the input layer of the artificial neural network, and multiplying one or more values for the one or more graph connections with one or more weights of the input layer of the artificial neural network.

The interactive media guidance application determines an output from the artificial neural network that indicates the type of conversation continuity between the first query and the second query. In some embodiments, the interactive media guidance application determines the output from the artificial neural network that indicates the type of conversation continuity between the first query and the second query by multiplying one or more inputs to a hidden layer in the artificial neural network with corresponding one or more weights in the hidden layer and adding resulting values from the multiplying to determine the output value.

The interactive media guidance application updates the second query based on the type of conversation continuity. In some embodiments, the interactive media guidance application updates the second query based on the type of conversation continuity by identifying the type of conversation continuity to be a merge type and merging the second query with the first query based on identifying the type of conversation continuity to be the merge type. For example, the previous and next queries may be merged where the next query is a continuation of the previous query. An exemplary set of previous and next queries may be "movies of Tom Cruise" and "with Nicole Kidman." Another exemplary set of previous and next queries may be "get me some good Sci-Fi movies" and "on NETFLIX." Yet another exemplary set of previous and next queries may be "looking for Tom Cruise flicks" and "interested in the ones with Nicole Kidman."

In some embodiments, the interactive media guidance application updates the second query based on the type of conversation continuity by identifying the type of conversation continuity to be a replacement type, determining a portion of the second query that replaces a portion of the first query, and determining the second query to be the first query with the portion of the first query replaced with the portion of the second query. For example, a portion of the previous query may be replaced with a portion of the next query. An exemplary set of previous and next queries may be "is there any Red Sox game tonight" and "how about tomorrow." In this situation, "tomorrow" from the next query replaces "tonight" in the previous query.

In some embodiments, the interactive media guidance application updates the second query based on the type of conversation continuity by identifying the type of conversation continuity to be a clarification type, determining an alternative entity type for the first token in the first query based on the second query, and determining the second query to be the first query with the first token being the alternative entity type. For example, the next query may clarify an earlier entity from the previous query as opposed to adding more entities to the previous query. An exemplary set of previous and next queries may be "who won the Broncos game" and "I meant the college team." In this situation, the "I meant" feature clarifies the earlier entity in the previous query as opposed to adding more entities into the conversation. Another exemplary set of previous and next queries may be "Beethoven movies" and "I meant the dog." Similarly in this situation, the "I meant" feature clarifies the earlier entity in the previous query as opposed to adding more entities into the conversation.

In some embodiments, the interactive media guidance application updates the second query based on the type of conversation continuity by identifying the type of conversation continuity to be a no continuity type and assigning the second query to be the updated second query. For example, the next query may be independent of the previous query. An exemplary set of previous and next queries may be "action movies" and "comedy movies." In this situation, there is no conversation continuity between the previous and next queries.

The interactive media guidance application retrieves a second search result for the updated second query from the database. The interactive media guidance application generates for display the second search result. In some embodiments, the interactive media guidance application receives from the user input device an indication that the determined type of conversation continuity is incorrect and a corrected type of conversation continuity. The interactive media guidance application updates one or more weights in the artificial neural network based on the corrected type of conversation continuity.

Though the processes and examples in this disclosure are discussed with respect to a pair of queries, the systems and methods described are equally applicable to more than two queries. The systems and methods may track continuity across multiple queries and maintain context where appropriate. Additionally, though the processes and examples in this disclosure are discussed with respect to an artificial neural network, the systems and methods described are equally applicable to multiple artificial neural networks or in combination with other machine learning techniques. It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described to address shortcomings in a conventional conversation system via a novel technique utilizing artificial neural networks to train the conversation system whether or not to continue context. In some aspects, in an interactive media guidance application implemented using control circuitry, e.g., control circuitry 804 (FIG. 8), a user may request media assets via a textual query. In some aspects, in an interactive media guidance application implemented using control circuitry, e.g., control circuitry 804 (FIG. 8), a user may request media assets via a natural language query. The interactive media guidance application may include a conversation system to process the query and determine whether there is conversation continuity from a previous query to a next query.

Figure 1:
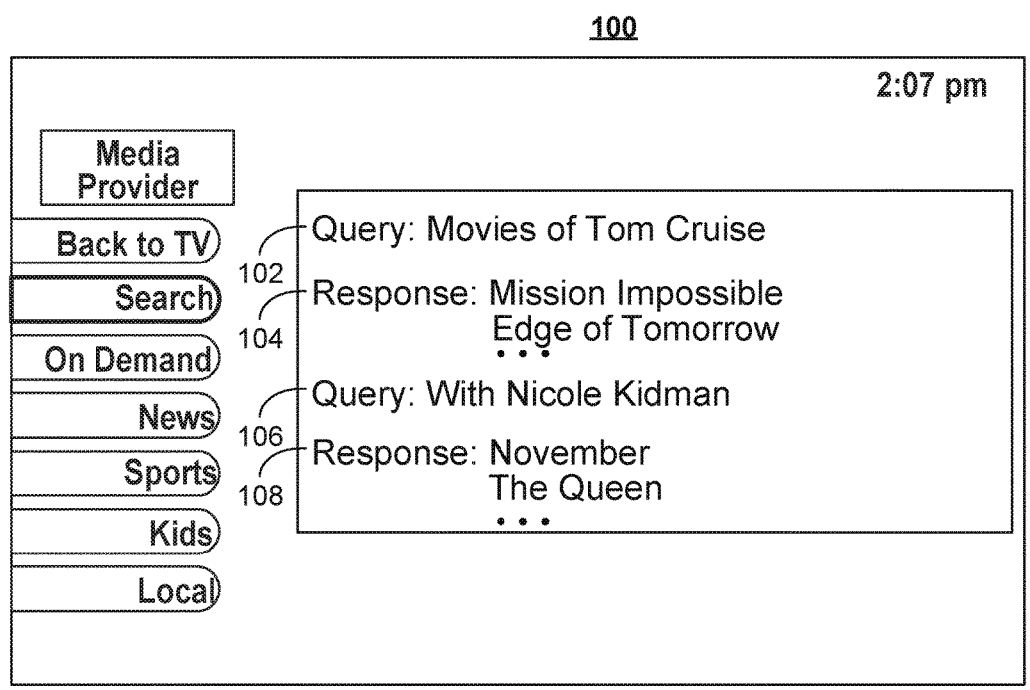
FIG. 1 shows an illustrative example of a display screen generated by a media guidance application in accordance with some embodiments of the disclosure.

FIG. 1 shows an illustrative example of a display screen 100 generated by the interactive media guidance application. The user requests media assets via query 102 "Movies of Tom Cruise." The interactive media guidance application retrieves search results from a database, e.g., media content source 916 (FIG. 9), and generates for display the search results in response 104. The user enters query 106 "With Nicole Kidman." The interactive media guidance application determines the type of conversation continuity in this situation to be merge continuity. In such situations, the previous and next queries are merged where the next query is a continuation of the previous query. The two queries 102 and 106 are merged and search results are retrieved based on the merged query. The interactive media guidance application retrieves search results from a database, e.g., media content source 916 (FIG. 9), and generates for display the search results in response 108.

Figure 2:
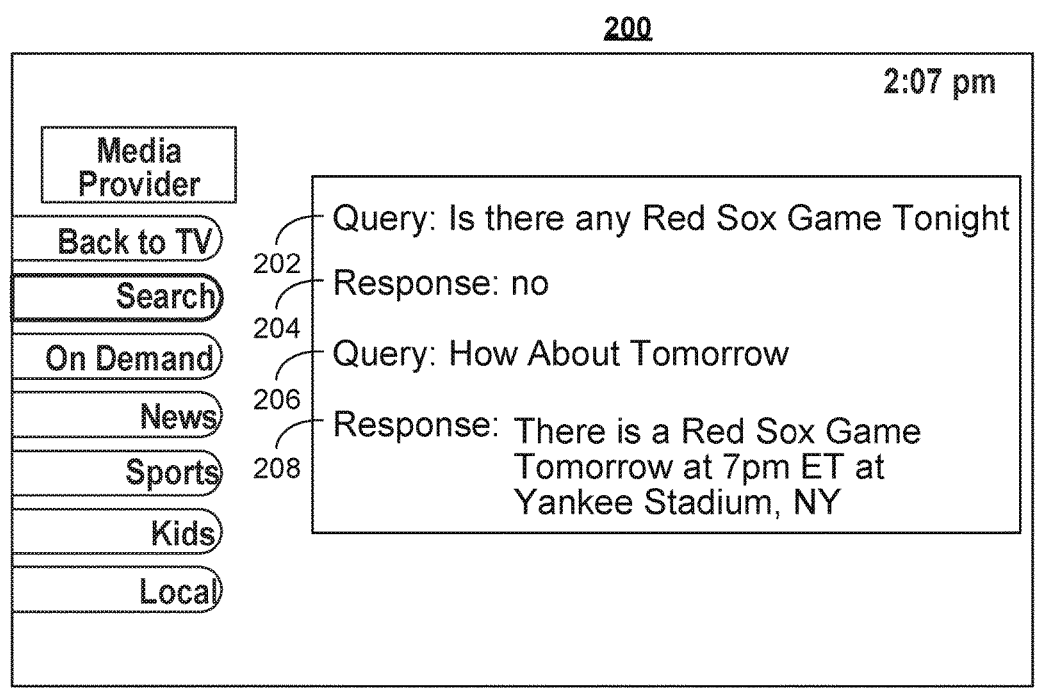
FIG. 2 shows another illustrative example of a display screen generated by a media guidance application in accordance with some embodiments of the disclosure.

FIG. 2 shows another illustrative example of a display screen 200 generated by the interactive media guidance application. The user requests media assets via query 202 "Is there any Red Sox game tonight." The interactive media guidance application retrieves search results from a database, e.g., media content source 916 (FIG. 9), and generates for display the search results in response 204. The user enters query 206 "How about tomorrow." The interactive media guidance application determines the type of conversation continuity in this situation to be replacement continuity. In such situations, a portion of the previous query is replaced with a portion of the next query. The term "tomorrow" from query 206 replaces "tonight" in query 202. The interactive media guidance application retrieves search results from a database, e.g., media content source 916 (FIG. 9), and generates for display the search results in response 208.

Figure 3:
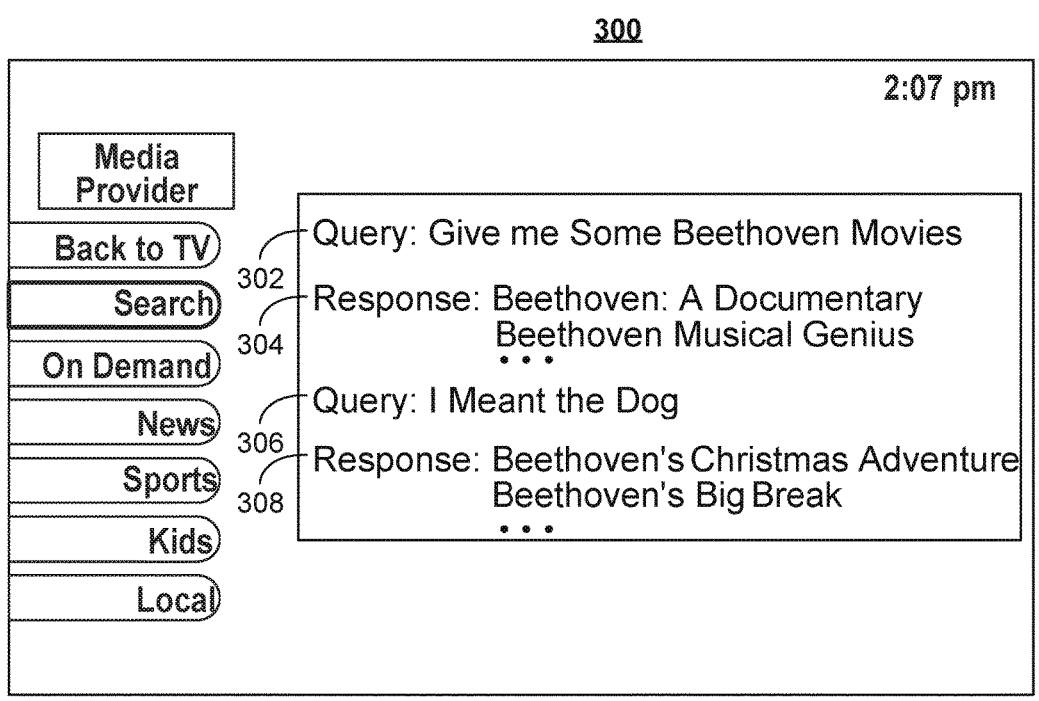
FIG. 3 shows yet another illustrative example of a display screen generated by a media guidance application in accordance with some embodiments of the disclosure.

FIG. 3 shows yet another illustrative example of a display screen 300 generated by the interactive media guidance application. The user requests media assets via query 302 "Give me some Beethoven movies." The interactive media guidance application retrieves search results from a database, e.g., media content source 916 (FIG. 9), and generates for display the search results in response 304. The user enters query 306 "I meant the Dog." The interactive media guidance application determines the type of conversation continuity in this situation to be clarification continuity. In such situations, the next query clarifies an earlier entity from the previous query as opposed to adding more entities to the previous query. The "I meant" feature from query 306 clarifies the earlier entity in query 302 as opposed to adding more entities into the conversation. Query 302 is updated based on the entity type in query 306. The interactive media guidance application retrieves search results from a database, e.g., media content source 916 (FIG. 9), and generates for display the search results in response 308.

Figure 4:
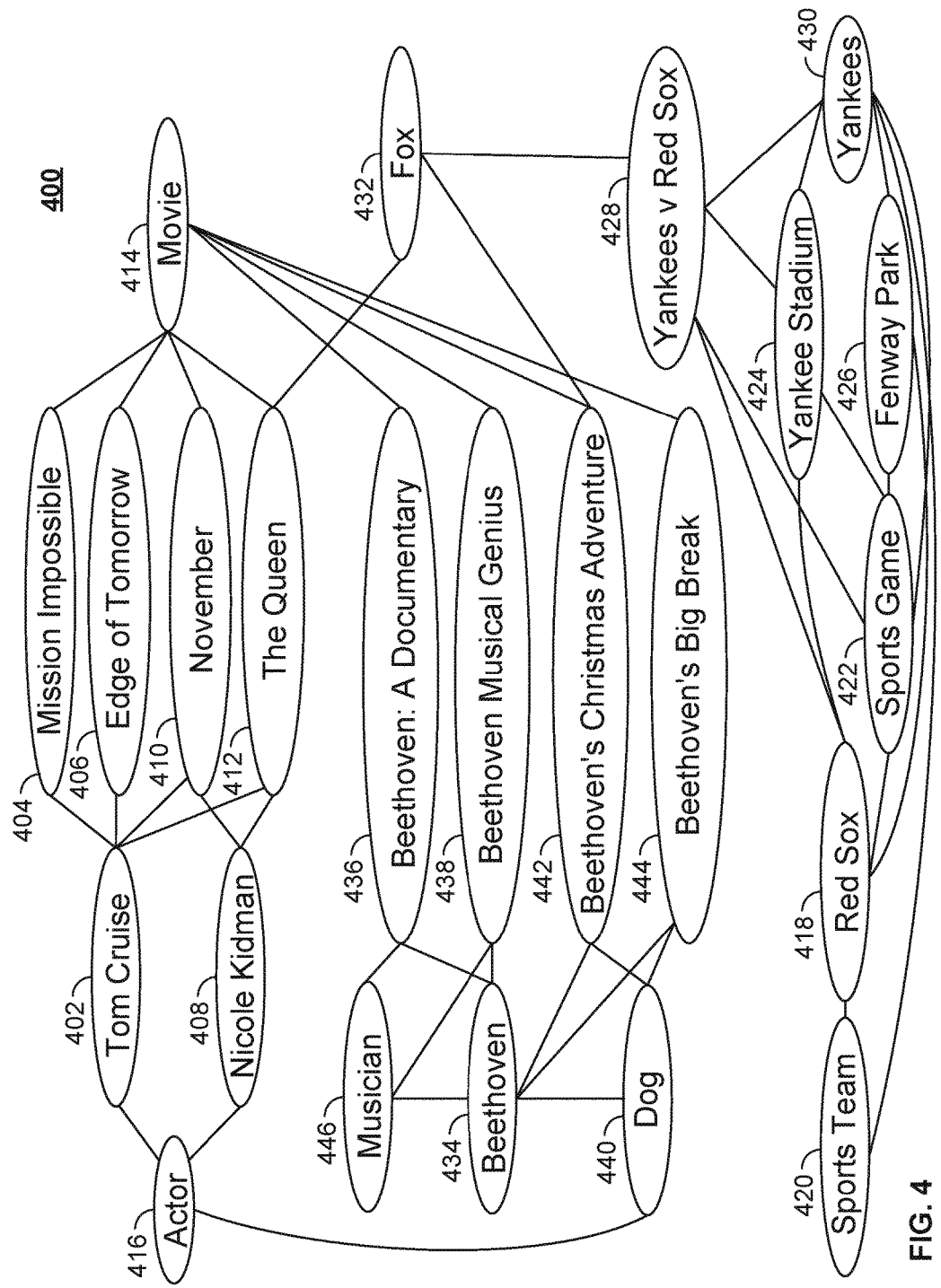
FIG. 4 shows a knowledge graph in accordance with some embodiments of the disclosure.
Figure 8:
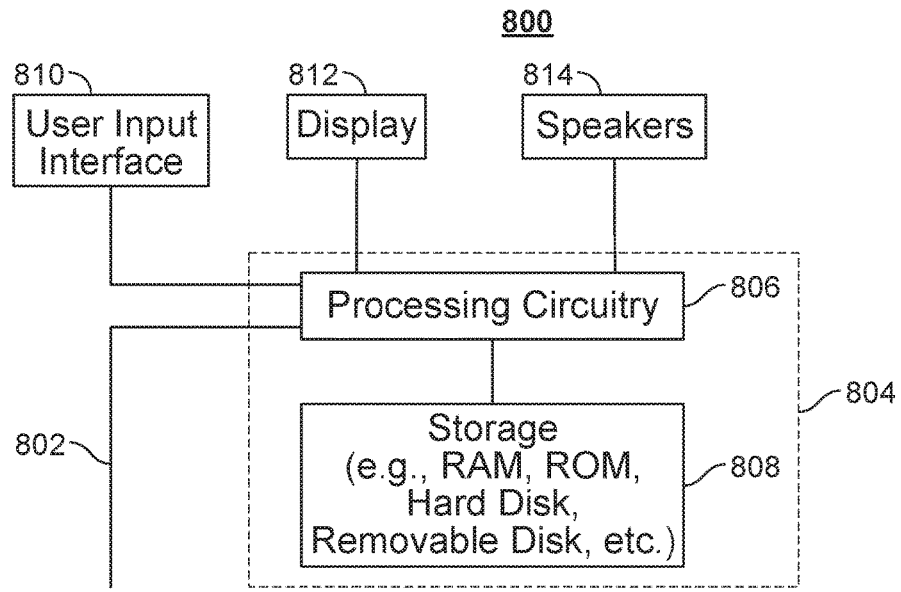
FIG. 8 is a block diagram of an illustrative user equipment device in accordance with some embodiments of the disclosure.

FIG. 4 shows a knowledge graph 400 in accordance with some embodiments of the disclosure. The interactive media guidance application may retrieve graph connections between entities from the knowledge graph stored in memory, e.g., storage 808 (FIG. 8). For example, the interactive media guidance application may retrieve graph connections common to node 402 "Tom Cruise" and node 408 "Nicole Kidman," i.e., nodes 410 and 412, for movies starring both actors. Node 416 indicates that they are both actors. Nodes 404 and 406 are movies as indicated by node 414 and also starring "Tom Cruise" as indicated by the graphs connections with node 402. In another example, the interactive media guidance application may retrieve a graph connection between node 418 "Red Sox" and node 428 for sports game "Yankees v. Red Sox." Node 432 indicates the game is on the "Fox" channel (along with movie "The Queen," node 412). The graph connection between node 428 and node 424 "Yankee Stadium" indicates the sports game (node 422) is held at the stadium for the Yankees (node 430). The graph connection between node 418 "Red Sox" and node 420 indicates they are a sports team. The graph connection between node 418 and 426 indicates their stadium is "Fenway Park." In yet another example, the interactive media guidance application may retrieve a graph connection between node 434 "Beethoven" and node 440 "Dog." The common nodes 442 and 444 indicate they are movies starring "Beethoven" the "Dog." Alternatively, the interactive media guidance application may retrieve a graph connection between node 434 "Beethoven" and node 446 "Musician." The common nodes 436 and 428 indicate they are movies starring "Beethoven" the "Musician."

Figure 5:
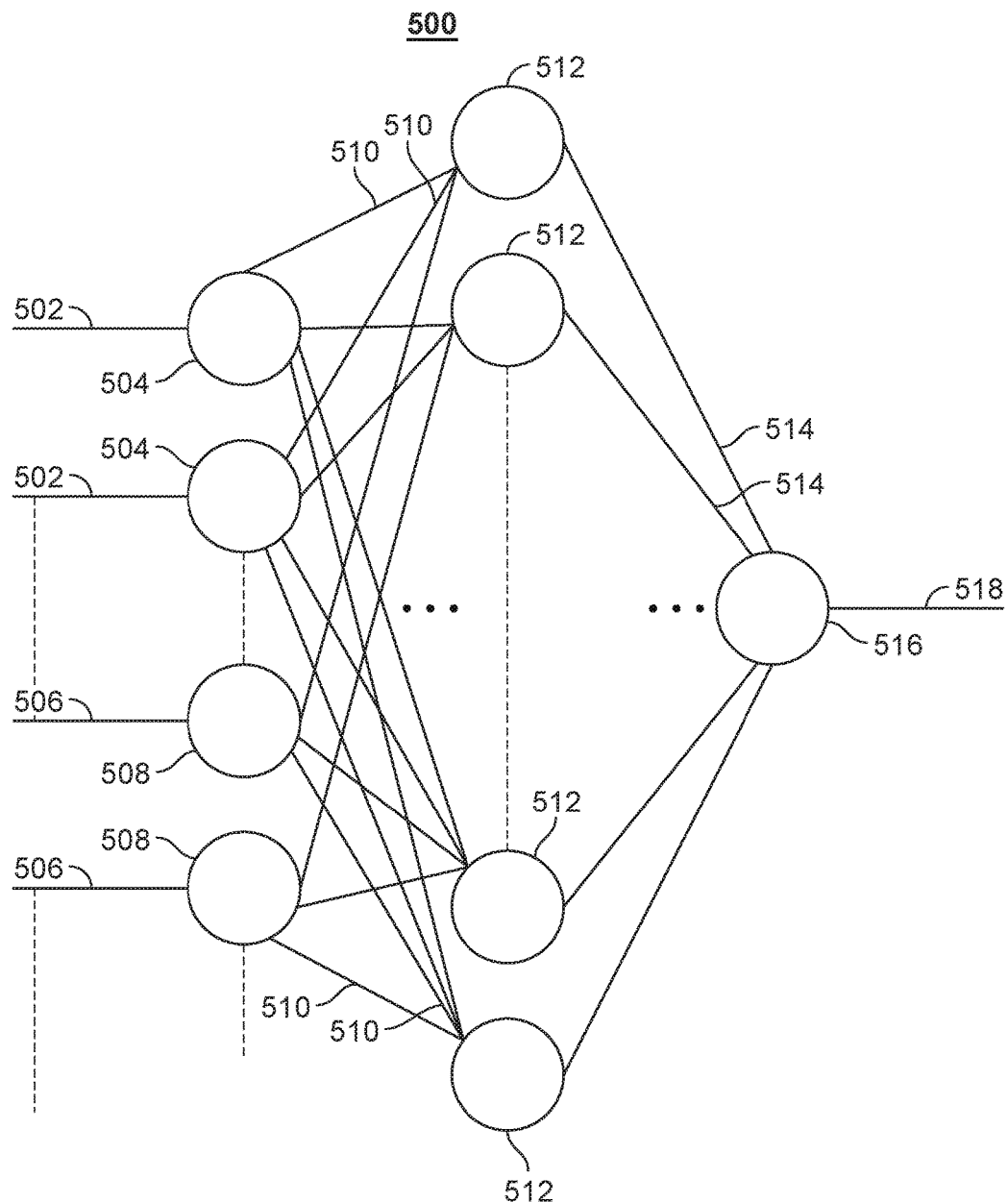
FIG. 5 shows an artificial neural network in accordance with some embodiments of the disclosure.

FIG. 5 shows an artificial neural network 500 in accordance with some embodiments of the disclosure. The conversation system implemented in the interactive media guidance application may be trained using an artificial neural network to determine whether to continue context or not across queries. At the input layer, the artificial neural network may be fed with examples and associated entity data of previous and next queries 502 and 506. The features that are provided as input into the artificial neural network may include words/tokens of the previous and current query, probabilities of the entity types each token refers to (e.g., R may refer to an R rating as well a movie named "R"), graph connections between the various entities, and other suitable features. The features are fed as different inputs 502 and 506 to the network. The network may have one or more hidden layers 512 to then create the output 518 that denotes a multi-class denoting the type of conversation continuity (normalized at 516 as needed). Initial layer 504, 508 may be added to filter common or filler words, e.g., articles, and consider only words that can act as potential features. All the words and phrases in the previous and next queries are then considered as potential features. Furthermore, the entities in the queries may be replaced by the entity type. For example, "movies with Tom Cruise" may be replaced with "movies with." In this way, a particular example can be representative of a whole class of queries.

The training of the artificial neural network may involve feeding multiple examples of previous-next queries where context is preserved and feeding multiple examples of previous-next queries where context is not preserved. Weights 510 and 514 may be updated as the training progresses. The number of hidden layers 512 can be a parameter that can be used to control the accuracy of the artificial neural network. Once the artificial neural network is trained, it can be used to detect context switching in real user queries via output 518. One advantage of this method is the ability to continuously train the network with more examples whenever it fails so that it may learn all possible situations over time. For example, the user may provide feedback when the network fails to detect a context switch or indicates a context switch where none exists.

For example, the interactive media guidance application may receive a first query, "movies of Tom Cruise," and a second query, "with Nicole Kidman." The interactive media guidance application may isolate the first query into tokens "movies of" and "Tom Cruise" and the second query into tokens "with" and "Nicole Kidman." The interactive media guidance application may determine a possible entity type "Actor" for token "Tom Cruise" and probability of the token belonging to the entity type to be 0.99 and another possible entity type "Location" and probability of the token belonging to the entity type to be 0.01. The interactive media guidance application may determine possible entity type "Actor" for token "Nicole Kidman" and probability of the token belonging to the entity type to be 1.

For each pair of possible entity types across tokens, the interactive media guidance application may retrieve graph connections for the pairs of possible entity types. The interactive media guidance application may apply this data to inputs of artificial neural network 500. The interactive media guidance application may receive output 518 indicating conversation continuity between the first and second query and a type of the conversation continuity. For example, the interactive media guidance application may receive an output indicating that there is a merge type of conversation continuity between the first query and the second query. The interactive media guidance application may update the second query by merging the second query with the first query, i.e., "movies of Tom Cruise with Nicole Kidman." The interactive media guidance application receives results for the second query.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 6:
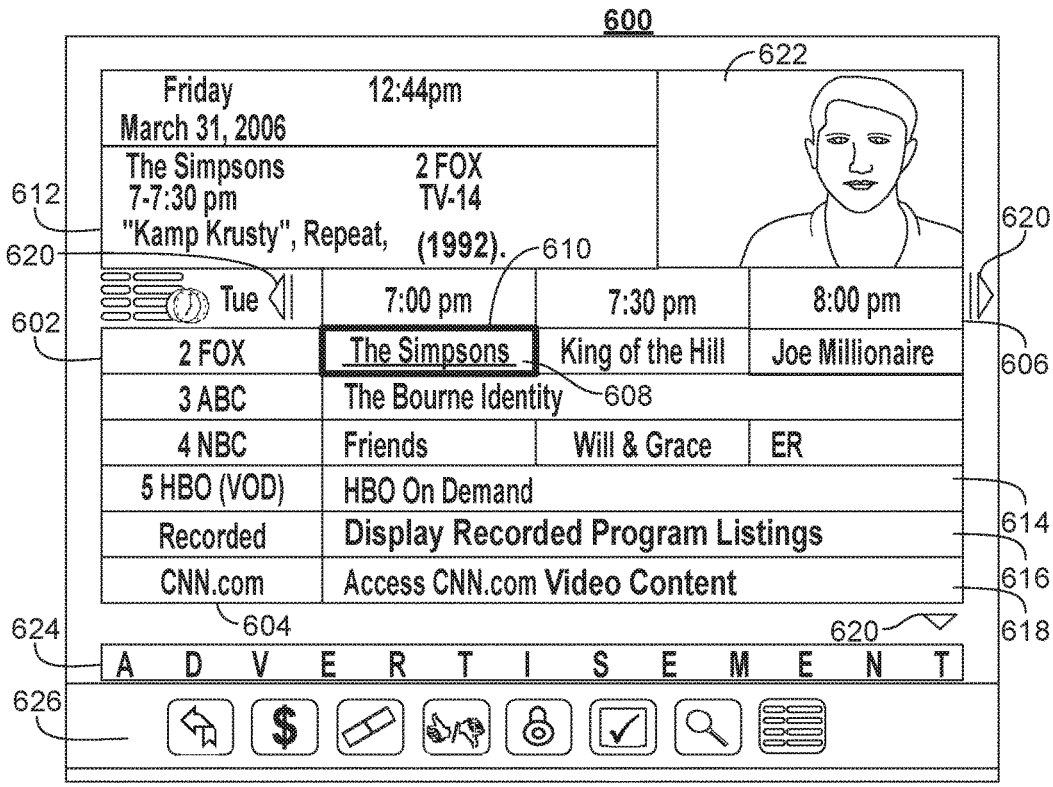
FIG. 6 shows yet another illustrative example of a display screen generated by a media guidance application in accordance with some embodiments of the disclosure.
Figure 7:
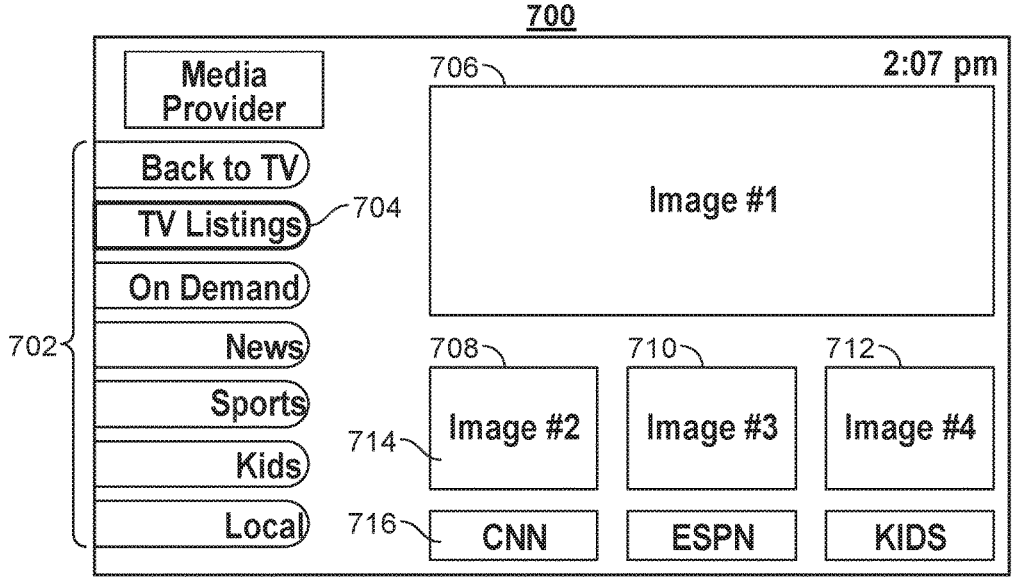
FIG. 7 shows yet another illustrative example of a display screen generated by a media guidance application in accordance with some embodiments of the disclosure.

FIGS. 6-7 show illustrative display screens that may be used to provide media guidance data. The display screens shown in FIGS. 6-7 may be implemented on any suitable user equipment device or platform. While the displays of FIGS. 6-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 6 shows illustrative grid of a program listings display 600 arranged by time and channel that also enables access to different types of content in a single display. Display 600 may include grid 602 with: (1) a column of channel/content type identifiers 604, where each channel/content type identifier (which is a cell in the column) identifies a different channel or content type available; and (2) a row of time identifiers 606, where each time identifier (which is a cell in the row) identifies a time block of programming. Grid 602 also includes cells of program listings, such as program listing 608, where each listing provides the title of the program provided on the listing's associated channel and time. With a user input device, a user can select program listings by moving highlight region 610. Information relating to the program listing selected by highlight region 610 may be provided in program information region 612. Region 612 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 602 may provide media guidance data for non-linear programming including on-demand listing 614, recorded content listing 616, and Internet content listing 618. A display combining media guidance data for content from different types of content sources is sometimes referred to as a "mixed-media" display. Various permutations of the types of media guidance data that may be displayed that are different than display 600 may be based on user selection or guidance application definition (e.g., a display of only recorded and broadcast listings, only on-demand and broadcast listings, etc.). As illustrated, listings 614, 616, and 618 are shown as spanning the entire time block displayed in grid 602 to indicate that selection of these listings may provide access to a display dedicated to on-demand listings, recorded listings, or Internet listings, respectively. In some embodiments, listings for these content types may be included directly in grid 602. Additional media guidance data may be displayed in response to the user selecting one of the navigational icons 620. (Pressing an arrow key on a user input device may affect the display in a similar manner as selecting navigational icons 620.)

Display 600 may also include video region 622, and options region 626. Video region 622 may allow the user to view and/or preview programs that are currently available, will be available, or were available to the user. The content of video region 622 may correspond to, or be independent from, one of the listings displayed in grid 602. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 626 may allow the user to access different types of content, media guidance application displays, and/or media guidance application features. Options region 626 may be part of display 600 (and other display screens described herein), or may be invoked by a user by selecting an on-screen option or pressing a dedicated or assignable button on a user input device. The selectable options within options region 626 may concern features related to program listings in grid 602 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 9. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 7. Video mosaic display 700 includes selectable options 702 for content information organized based on content type, genre, and/or other organization criteria. In display 700, television listings option 704 is selected, thus providing listings 706, 708, 710, and 712 as broadcast program listings. In display 700 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 708 may include more than one portion, including media portion 714 and text portion 716. Media portion 714 and/or text portion 716 may be selectable to view content in full-screen or to view information related to the content displayed in media portion 714 (e.g., to view listings for the channel that the video is displayed on).

The listings in display 700 are of different sizes (i.e., listing 706 is larger than listings 708, 710, and 712), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 8 shows a generalized embodiment of illustrative user equipment device 800. More specific implementations of user equipment devices are discussed below in connection with FIG. 9. User equipment device 800 may receive content and data via input/output (hereinafter "I/O") path 802. I/O path 802 may provide content (e.g., broadcast programming, on-demand programming, Internet content, content available over a local area network (LAN) or wide area network (WAN), and/or other content) and data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a media guidance application stored in memory (i.e., storage 808). Specifically, control circuitry 804 may be instructed by the media guidance application to perform the functions discussed above and below. For example, the media guidance application may provide instructions to control circuitry 804 to generate the media guidance displays. In some implementations, any action performed by control circuitry 804 may be based on instructions received from the media guidance application.

In client-server based embodiments, control circuitry 804 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media guidance data described above. Nonvolatile memory may also be used (e.g., to launch a boot-up routine and other instructions). Cloud-based storage, described in relation to FIG. 9, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of the user equipment 800. Circuitry 804 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment 800, the tuning and encoding circuitry (including multiple tuners) may be associated with storage 808.

A user may send instructions to control circuitry 804 using user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of user equipment device 800. For example, display 812 may be a touchscreen or touch-sensitive display. In such circumstances, user input interface 810 may be integrated with or combined with display 812. Display 812 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 812 may be HDTV-capable. In some embodiments, display 812 may be a 3D display, and the interactive media guidance application and any suitable content may be displayed in 3D. A video card or graphics card may generate the output to the display 812. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 804. The video card may be integrated with the control circuitry 804. Speakers 814 may be provided as integrated with other elements of user equipment device 800 or may be stand-alone units. The audio component of videos and other content displayed on display 812 may be played through speakers 814. In some embodiments, the audio may be distributed to a receiver (not shown), which processes and outputs the audio via speakers 814.

The guidance application may be implemented using any suitable architecture. For example, it may be a stand-alone application wholly-implemented on user equipment device 800. In such an approach, instructions of the application are stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to generate any of the displays discussed herein. Based on the processed instructions, control circuitry 804 may determine what action to perform when input is received from input interface 810. For example, movement of a cursor on a display up/down may be indicated by the processed instructions when input interface 810 indicates that an up/down button was selected.

In some embodiments, the media guidance application is a client-server based application. Data for use by a thick or thin client implemented on user equipment device 800 is retrieved on-demand by issuing requests to a server remote to the user equipment device 800. In one example of a client-server based guidance application, control circuitry 804 runs a web browser that interprets web pages provided by a remote server. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on equipment device 800. This way, the processing of the instructions is performed remotely by the server while the resulting displays are provided locally on equipment device 800. Equipment device 800 may receive inputs from the user via input interface 810 and transmit those inputs to the remote server for processing and generating the corresponding displays. For example, equipment device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to equipment device 800 for presentation to the user.

In some embodiments, the media guidance application is downloaded and interpreted or otherwise run by an interpreter or virtual machine (run by control circuitry 804). In some embodiments, the guidance application may be encoded in the ETV Binary Interchange Format (EBIF), received by control circuitry 804 as part of a suitable feed, and interpreted by a user agent running on control circuitry 804. For example, the guidance application may be an EBIF application. In some embodiments, the guidance application may be defined by a series of JAVA-based files that are received and run by a local virtual machine or other suitable middleware executed by control circuitry 804. In some of such embodiments (e.g., those employing MPEG-2 or other digital media encoding schemes), the guidance application may be, for example, encoded and transmitted in an MPEG-2 object carousel with the MPEG audio and video packets of a program.

Figure 9:
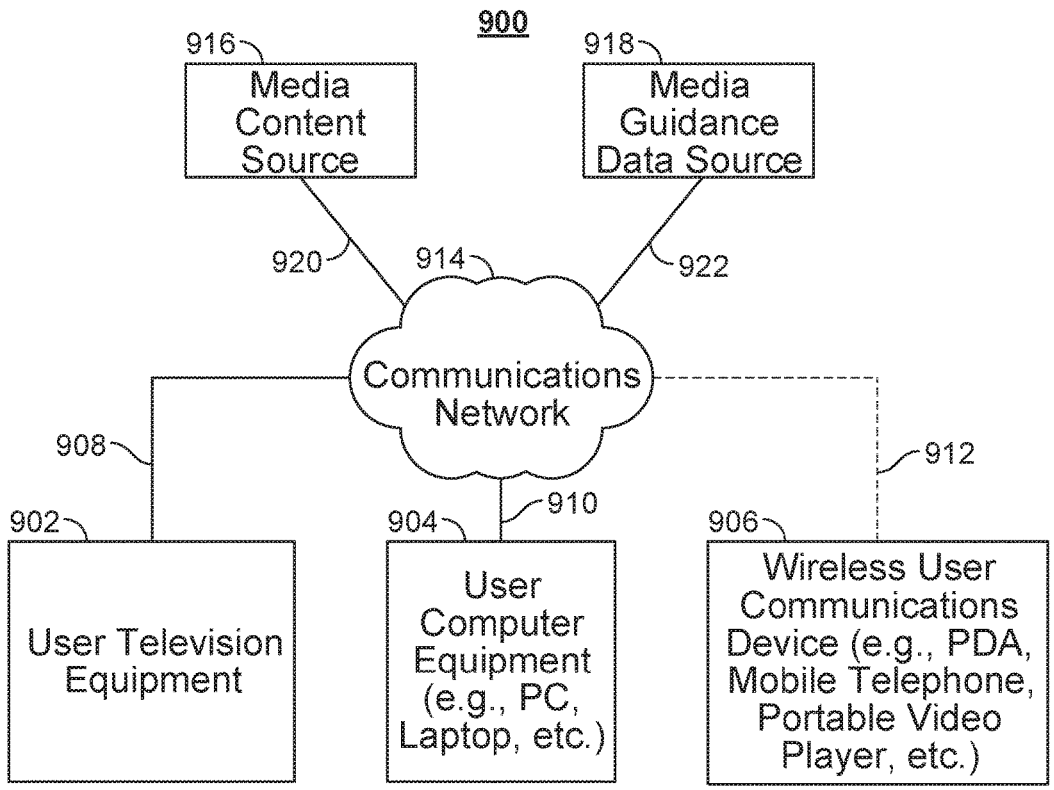
FIG. 9 is a block diagram of an illustrative media system in accordance with some embodiments of the disclosure.

User equipment device 800 of FIG. 8 can be implemented in system 900 of FIG. 9 as user television equipment 902, user computer equipment 904, wireless user communications device 906, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 8 may not be classified solely as user television equipment 902, user computer equipment 904, or a wireless user communications device 906. For example, user television equipment 902 may, like some user computer equipment 904, be Internet-enabled allowing for access to Internet content, while user computer equipment 904 may, like some television equipment 902, include a tuner allowing for access to television programming. The media guidance application may have the same layout on various different types of user equipment or may be tailored to the display capabilities of the user equipment. For example, on user computer equipment 904, the guidance application may be provided as a web site accessed by a web browser. In another example, the guidance application may be scaled down for wireless user communications devices 906.

In system 900, there is typically more than one of each type of user equipment device but only one of each is shown in FIG. 9 to avoid overcomplicating the drawing. In addition, each user may utilize more than one type of user equipment device and also more than one of each type of user equipment device.

In some embodiments, a user equipment device (e.g., user television equipment 902, user computer equipment 904, wireless user communications device 906) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 914. Namely, user television equipment 902, user computer equipment 904, and wireless user communications device 906 are coupled to communications network 914 via communications paths 908, 910, and 912, respectively. Communications network 914 may be one or more networks including the Internet, a mobile phone network, mobile voice or data network (e.g., a 4G or LTE network), cable network, public switched telephone network, or other types of communications network or combinations of communications networks. Paths 908, 910, and 912 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 912 is drawn with dotted lines to indicate that in the exemplary embodiment shown in FIG. 9 it is a wireless path and paths 908 and 910 are drawn as solid lines to indicate they are wired paths (although these paths may be wireless paths, if desired). Communications with the user equipment devices may be provided by one or more of these communications paths, but are shown as a single path in FIG. 9 to avoid overcomplicating the drawing.

Although communications paths are not drawn between user equipment devices, these devices may communicate directly with each other via communication paths, such as those described above in connection with paths 908, 910, and 912, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 914.

System 900 includes content source 916 and media guidance data source 918 coupled to communications network 914 via communication paths 920 and 922, respectively. Paths 920 and 922 may include any of the communication paths described above in connection with paths 908, 910, and 912. Communications with the content source 916 and media guidance data source 918 may be exchanged over one or more communications paths, but are shown as a single path in FIG. 9 to avoid overcomplicating the drawing. In addition, there may be more than one of each of content source 916 and media guidance data source 918, but only one of each is shown in FIG. 9 to avoid overcomplicating the drawing. (The different types of each of these sources are discussed below.) If desired, content source 916 and media guidance data source 918 may be integrated as one source device. Although communications between sources 916 and 918 with user equipment devices 902, 904, and 906 are shown as through communications network 914, in some embodiments, sources 916 and 918 may communicate directly with user equipment devices 902, 904, and 906 via communication paths (not shown) such as those described above in connection with paths 908, 910, and 912.

Content source 916 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 916 may be the originator of content (e.g., a television broadcaster, a Webcast provider, etc.) or may not be the originator of content (e.g., an on-demand content provider, an Internet provider of content of broadcast programs for downloading, etc.). Content source 916 may include cable sources, satellite providers, on-demand providers, Internet providers, over-the-top content providers, or other providers of content. Content source 916 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 918 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 918 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 918 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 918 may provide user equipment devices 902, 904, and 906 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 808, and executed by control circuitry 804 of a user equipment device 800. In some embodiments, media guidance applications may be client-server applications where only a client application resides on the user equipment device, and server application resides on a remote server. For example, media guidance applications may be implemented partially as a client application on control circuitry 804 of user equipment device 800 and partially on a remote server as a server application (e.g., media guidance data source 918) running on control circuitry of the remote server. When executed by control circuitry of the remote server (such as media guidance data source 918), the media guidance application may instruct the control circuitry to generate the guidance application displays and transmit the generated displays to the user equipment devices. The server application may instruct the control circuitry of the media guidance data source 918 to transmit data for storage on the user equipment. The client application may instruct control circuitry of the receiving user equipment to generate the guidance application displays.

Content and/or media guidance data delivered to user equipment devices 902, 904, and 906 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 900 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 9.

In one approach, user equipment devices may communicate with each other within a home network. User equipment devices can communicate with each other directly via short-range point-to-point communication schemes described above, via indirect paths through a hub or other similar device provided on a home network, or via communications network 914. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 916 to access content. Specifically, within a home, users of user television equipment 902 and user computer equipment 904 may access the media guidance application to navigate among and locate desirable content. Users may also access the media guidance application outside of the home using wireless user communications devices 906 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 914. These cloud resources may include one or more content sources 916 and one or more media guidance data sources 918. In addition or in the alternative, the remote computing sites may include other user equipment devices, such as user television equipment 902, user computer equipment 904, and wireless user communications device 906. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 904 or wireless user communications device 906 having content capture feature. Alternatively, the user can first transfer the content to a user equipment device, such as user computer equipment 904. The user equipment device storing the content uploads the content to the cloud using a data transmission service on communications network 914. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 8.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 10:
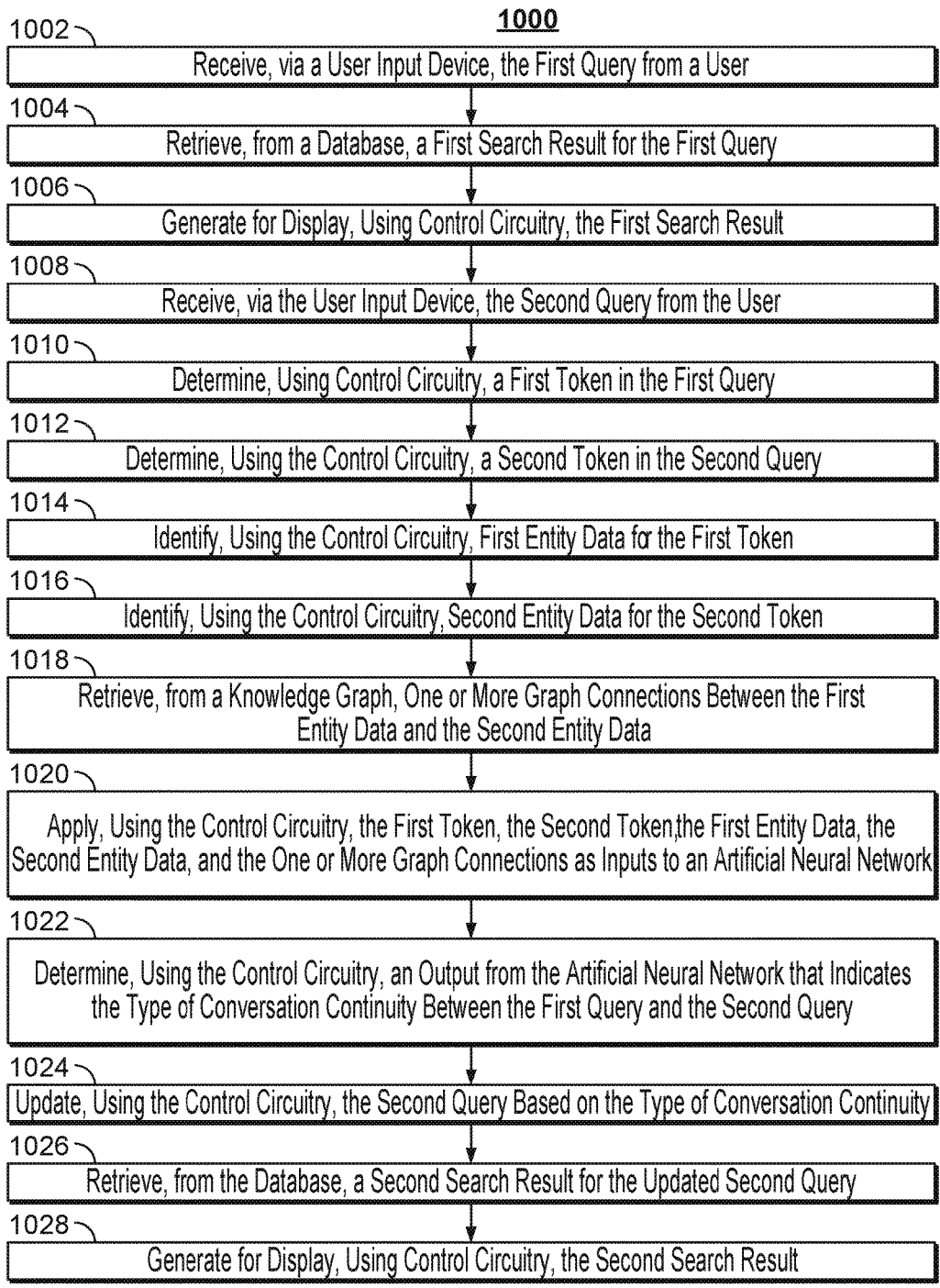
FIG. 10 is a flowchart of an illustrative process for determining a type of conversation continuity in a natural language conversation comprising a first query and a second query in accordance with some embodiments of the disclosure.

FIG. 10 is a flowchart of an illustrative process 1000 for determining a type of conversation continuity in a natural language conversation comprising a first query and a second query in accordance with some embodiments of the disclosure. FIG. 10 presents a process for control circuitry (e.g., control circuitry 804) to determine a type of conversation continuity in a natural language conversation comprising a first query and a second query in accordance with some embodiments of the disclosure. In some embodiments this algorithm may be encoded on to non-transitory storage medium (e.g., storage device 808) as a set of instructions to be decoded and executed by processing circuitry (e.g., processing circuitry 806). Processing circuitry may in turn provide instructions to other sub-circuits contained within control circuitry 804, such as the tuning, video generating, encoding, decoding, encrypting, decrypting, scaling, analog/digital conversion circuitry, and the like.

At step 1002, control circuitry 804 receives the first query from a user via a user input device. For example, control circuitry 804 may receive a first query, "Give me some Beethoven movies." At step 1004, control circuitry 804 retrieves a first search result for the first query from a database. At step 1006, control circuitry 804 generates for display the first search result. For example, control circuitry 804 may retrieve and generate for display search results "Beethoven: A Documentary" and "Beethoven Musical Genius." At step 1008, control circuitry 804 receives the second query from the user via the user input device. For example, control circuitry 804 may receive a second query, "I meant the Dog."

At step 1010, control circuitry 804 determines a first token in the first query. For example, control circuitry 804 may determine a first token "Beethoven" in the first query. In some embodiments, control circuitry 804 determines the first token in the first query by identifying a first term and a second term in the first query, determining the first term is a filler word, determining the second term is not a filler word, and assigning the second term to be the first token. For example, control circuitry 804 may identify "some" and "Beethoven" among other terms in the first query. Control circuitry 804 may determine "some" to be a filler word and "Beethoven" to be not a filler word. Control circuitry 804 may assign "Beethoven" as the first token.

At step 1012, control circuitry 804 determines a second token in the second query. For example, control circuitry 804 may determine "Dog" to be a second token in the second query. At step 1014, control circuitry 804 identifies first entity data for the first token. The first entity data may include a first entity type for the first token, a first probability that the first entity type corresponds to the first token, a second entity type for the first token, and a second probability that the second entity type corresponds to the first token. For example, control circuitry 804 may identify a first entity type "Musician" and a first probability of 0.75 and a second entity type "Dog" and a second probability of 0.25. At step 1016, control circuitry 804 identifies second entity data for the second token. The second entity data may include a third entity type for the second token, a third probability that the third entity type corresponds to the second token, a fourth entity type for the second token, and a fourth probability that the fourth entity type corresponds to the second token.

At step 1018, control circuitry 804 retrieves, from a knowledge graph (e.g., knowledge graph 400), one or more graph connections between the first entity data and the second entity data. For example, control circuitry 804 may retrieve a graph connection between first entity data for the first token "Beethoven" and second entity data for the second token "Dog." In some embodiments, control circuitry 804 retrieves the one or more graph connections between the first entity data and the second entity data by retrieving a first graph connection between the first token being the first entity type and the second token being the third entity type, retrieving a second graph connection between the first token being the second entity type and the second token being the third entity type, retrieving a third graph connection between the first token being the first entity type and the second token being the fourth entity type, and retrieving a fourth graph connection between the first token being the second entity type and the second token being the fourth entity type.

At step 1020, control circuitry 804 applies the first token, the second token, the first entity data, the second entity data, and the one or more graph connections as inputs to an artificial neural network (e.g., artificial neural network 500). In some embodiments, control circuitry 804 applies the first token, the second token, the first entity data, the second entity data, and the one or more graph connections as inputs to the artificial neural network by multiplying a first value for the first token with a first weight of an input layer of the artificial neural network, multiplying a second value for the second token with a second weight of the input layer of the artificial neural network, multiplying one or more values for the first entity data with one or more weights of the input layer of the artificial neural network, multiplying one or more values for the second entity data with one or more weights of the input layer of the artificial neural network, and multiplying one or more values for the one or more graph connections with one or more weights of the input layer of the artificial neural network.

At step 1022, control circuitry 804 determines an output from the artificial neural network that indicates the type of conversation continuity between the first query and the second query. In some embodiments, control circuitry 804 determines the output from the artificial neural network that indicates the type of conversation continuity between the first query and the second query by multiplying one or more inputs to a hidden layer in the artificial neural network with corresponding one or more weights in the hidden layer and adding resulting values from the multiplying to determine the output value.

At step 1024, control circuitry 804 updates the second query based on the type of conversation continuity. In some embodiments, control circuitry 804 updates the second query based on the type of conversation continuity by identifying the type of conversation continuity to be a merge type and merging the second query with the first query based on identifying the type of conversation continuity to be the merge type. For example, the previous and next queries may be merged where the next query is a continuation of the previous query. An exemplary set of previous and next queries may be "movies of Tom Cruise" and "with Nicole Kidman." Another exemplary set of previous and next queries may be "get me some good Sci-Fi movies" and "on NETFLIX." Yet another exemplary set of previous and next queries may be "looking for Tom Cruise flicks" and "interested in the ones with Nicole Kidman."

In some embodiments, control circuitry 804 updates the second query based on the type of conversation continuity by identifying the type of conversation continuity to be a replacement type, determining a portion of the second query that replaces a portion of the first query, and determining the second query to be the first query with the portion of the first query replaced with the portion of the second query. For example, a portion of the previous query may be replaced with a portion of the next query. An exemplary set of previous and next queries may be "is there any Red Sox game tonight" and "how about tomorrow." In this situation, "tomorrow" from the next query replaces "tonight" in the previous query.

In some embodiments, control circuitry 804 updates the second query based on the type of conversation continuity by identifying the type of conversation continuity to be a clarification type, determining an alternative entity type for the first token in the first query based on the second query, and determining the second query to be the first query with the first token being the alternative entity type. For example, the next query may clarify an earlier entity from the previous query as opposed to adding more entities to the previous query. An exemplary set of previous and next queries may be "who won the Broncos game" and "I meant the college team." In this situation, the "I meant" feature clarifies the earlier entity in the previous query as opposed to adding more entities into the conversation. Another exemplary set of previous and next queries may be "Beethoven movies" and "I meant the dog." Similarly in this situation, the "I meant" feature clarifies the earlier entity in the previous query as opposed to adding more entities into the conversation.

In some embodiments, control circuitry 804 updates the second query based on the type of conversation continuity by identifying the type of conversation continuity to be a no continuity type and assigning the second query to be the updated second query. For example, the next query may be independent of the previous query. An exemplary set of previous and next queries may be "action movies" and "comedy movies." In this situation, there is no conversation continuity between the previous and next queries.

At step 1026, control circuitry 804 retrieves a second search result for the updated second query from the database. At step 1028, control circuitry 804 generates for display the second search result. In some embodiments, control circuitry 804 receives an indication from the user input device that the determined type of conversation continuity is incorrect and a corrected type of conversation continuity. Control circuitry 804 updates one or more weights in the artificial neural network based on the corrected type of conversation continuity.

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 8-9 could be used to implement one or more portions of the process.

Figure 11:
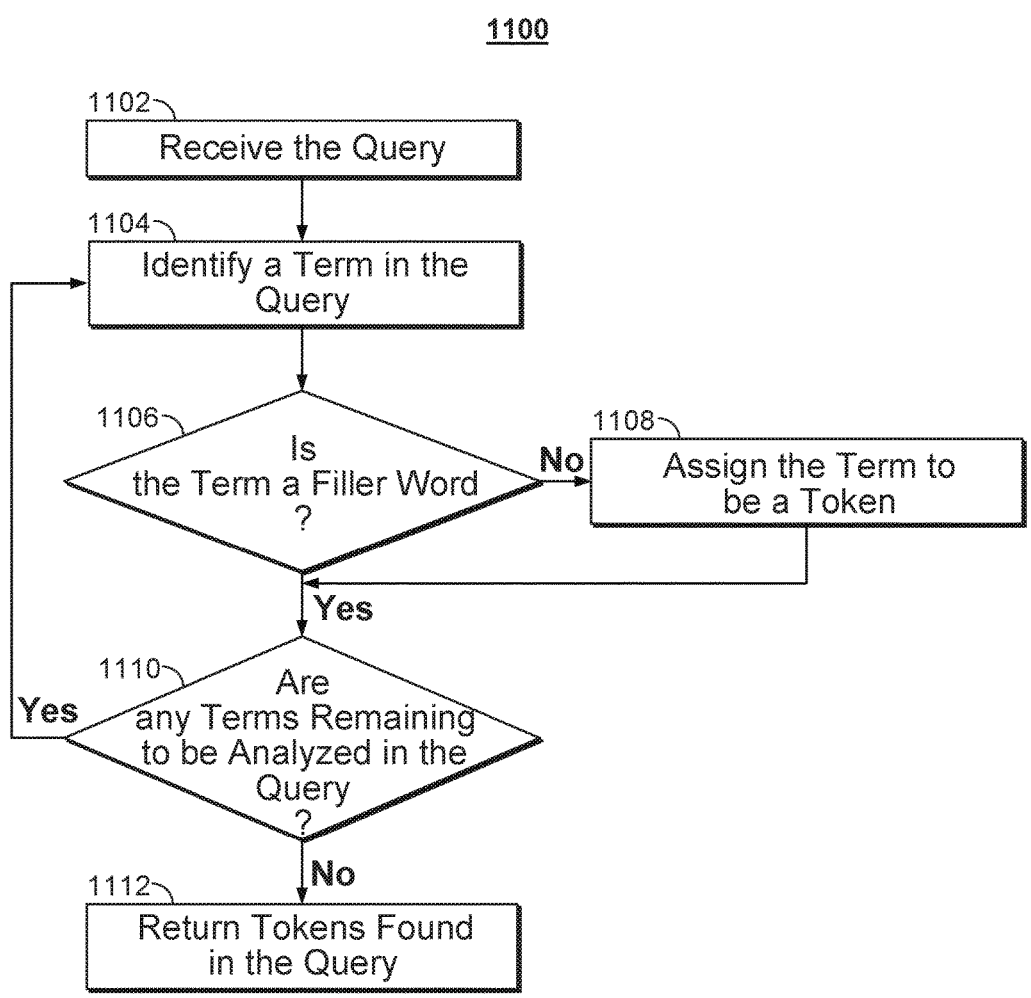
FIG. 11 is a flowchart of an illustrative process for determining one or more tokens in a natural language query in accordance with some embodiments of the disclosure.

FIG. 11 is a flowchart of an illustrative process 1100 for determining one or more tokens in a natural language query in accordance with some embodiments of the disclosure. The illustrative process provides exemplary steps for executing step 1010 or 1012 of FIG. 10. FIG. 11 presents a process for control circuitry (e.g., control circuitry 804) to determine one or more tokens in a natural language query in accordance with some embodiments of the disclosure. In some embodiments this algorithm may be encoded on to non-transitory storage medium (e.g., storage device 808) as a set of instructions to be decoded and executed by processing circuitry (e.g., processing circuitry 806). Processing circuitry may in turn provide instructions to other sub-circuits contained within control circuitry 804, such as the tuning, video generating, encoding, decoding, encrypting, decrypting, scaling, analog/digital conversion circuitry, and the like.

At step 1102, control circuitry 804 receives a query. For example, control circuitry 804 may receive query "some Beethoven movies." At step 1104, control circuitry 804 identifies a term in the query. At step 1106, control circuitry 804 determines whether the term is a filler word. If the term is not a filler word, at step 1108, control circuitry 804 assigns the term as a token for the query. If the term is a filler word, at step 1110, control circuitry 804 skips the term and determines whether any terms in the query remain to be analyzed. If terms in the query remain to be analyzed, at step 1104, control circuitry 804 identifies another term in the query. If no terms remain to be analyzed, at step 1112, control circuitry 804 returns the tokens found in the query. For example, control circuitry 804 may identify "some" and "Beethoven" among other terms in the query. Control circuitry 804 may determine "some" to be a filler word and "Beethoven" to not be a filler word. Control circuitry 804 may assign "Beethoven" as a token for the query but not assign "some" as a token for the query. Control circuitry 804 may return "Beethoven" as a token for the query.

It is contemplated that the steps or descriptions of FIG. 11 may be used with any other embodiment of this disclosure. In addition, the descriptions described in relation to the algorithm of FIG. 11 may be done in alternative orders or in parallel to further the purposes of this disclosure. For example, conditional statements and logical evaluations, such as those at 1106 and 1110, may be performed in any order or in parallel or simultaneously to reduce lag or increase the speed of the system or method. As a further example, in some embodiments several instances of a term in the query may be evaluated in parallel, using multiple logical processor threads, or the algorithm may be enhanced by incorporating branch prediction. Furthermore, it should be noted that the process of FIG. 11 may be implemented on a combination of appropriately configured software and hardware, and that any of the devices or equipment discussed in relation to FIGS. 8-9 could be used to implement one or more portions of the process.

Figure 12:
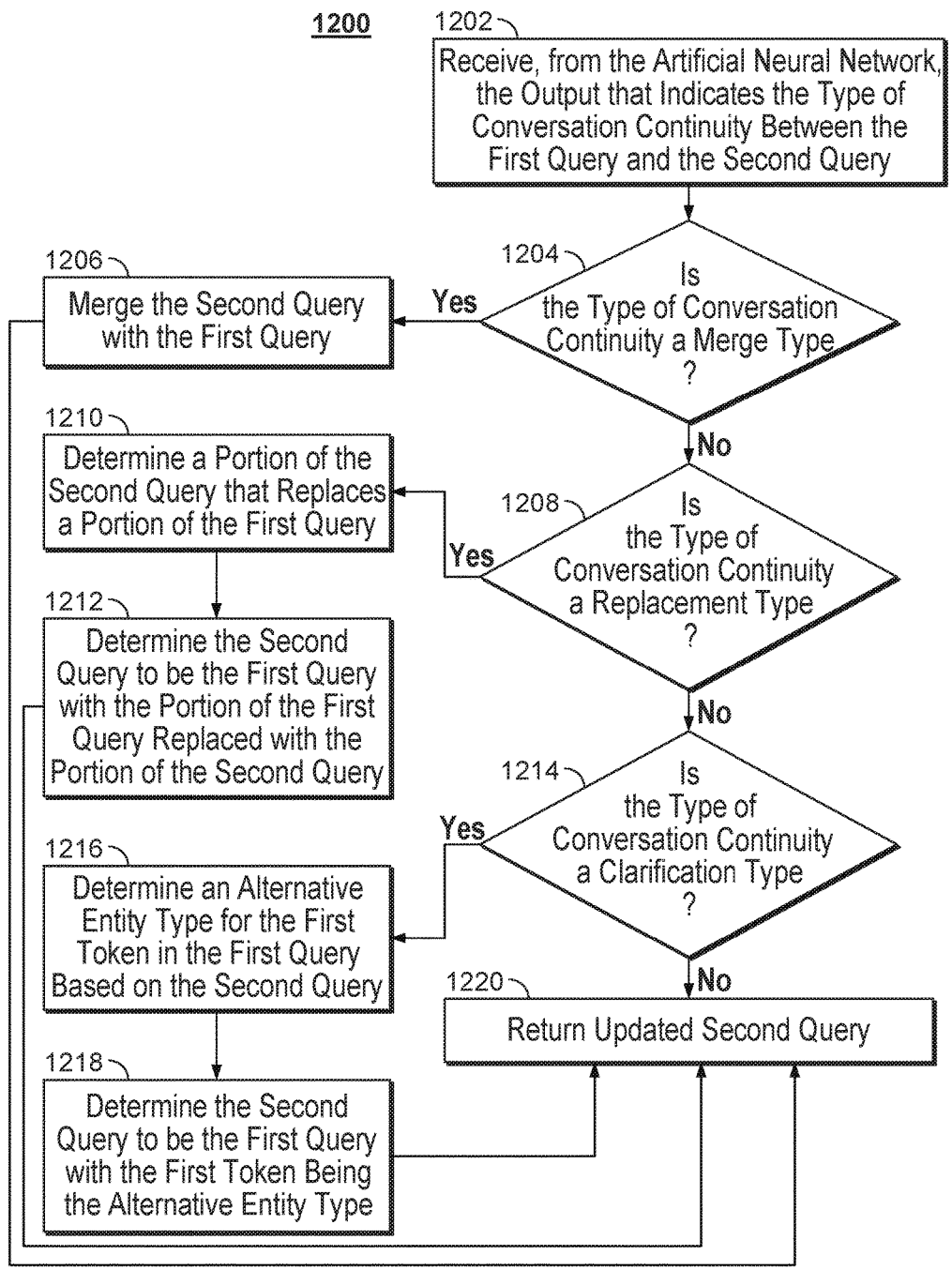
FIG. 12 is a flowchart of an illustrative process for updating the second query based on the type of conversation continuity in accordance with some embodiments of the disclosure.

FIG. 12 is a flowchart of an illustrative process 1200 for updating the second query based on the type of conversation continuity in accordance with some embodiments of the disclosure. The illustrative process provides exemplary steps for executing step 1024 of FIG. 10. FIG. 12 presents a process for control circuitry (e.g., control circuitry 804) to update the second query based on the type of conversation continuity in accordance with some embodiments of the disclosure. In some embodiments this algorithm may be encoded on to non-transitory storage medium (e.g., storage device 808) as a set of instructions to be decoded and executed by processing circuitry (e.g., processing circuitry 806). Processing circuitry may in turn provide instructions to other sub-circuits contained within control circuitry 804, such as the tuning, video generating, encoding, decoding, encrypting, decrypting, scaling, analog/digital conversion circuitry, and the like.

At step 1202, control circuitry 804 receives from the artificial neural network (e.g., artificial neural network 500) the output that indicates the type of conversation continuity between the first query and the second query. At step 1204, control circuitry 804 determines whether the type of conversation continuity is a merge type. If the type of conversation continuity is a merge type, at step 1206, control circuitry 804 merges the second query with the first query based on identifying the type of conversation continuity to be the merge type. For example, the previous and next queries may be merged where the next query is a continuation of the previous query. An exemplary set of previous and next queries may be "movies of Tom Cruise" and "with Nicole Kidman." Another exemplary set of previous and next queries may be "get me some good Sci-Fi movies" and "on NETFLIX." Yet another exemplary set of previous and next queries may be "looking for Tom Cruise flicks" and "interested in the ones with Nicole Kidman." At step 1220, control circuitry 804 returns the updated second query.

If the type of conversation continuity is not a merge type, at step 1208, control circuitry 804 determines whether the type of conversation continuity is a replacement type. If the type of conversation continuity is a replacement type, at 1210, control circuitry 804 determines a portion of the second query that replaces a portion of the first query. At step 1212, control circuitry 804 determines the second query to be the first query with the portion of the first query replaced with the portion of the second query. For example, a portion of the previous query may be replaced with a portion of the next query. An exemplary set of previous and next queries may be "is there any Red Sox game tonight" and "how about tomorrow." In this situation, "tomorrow" from the next query replaces "tonight" in the previous query. At step 1220, control circuitry 804 returns the updated second query.

If the type of conversation continuity is not a replacement type, at step 1214, control circuitry 804 determines whether the type of conversation continuity is a clarification type. If the type of conversation continuity is a clarification type, at 1216, control circuitry 804 determines an alternative entity type for the first token in the first query based on the second query. At step 1218, control circuitry 804 determines the second query to be the first query with the first token being the alternative entity type. For example, the next query may clarify an earlier entity from the previous query as opposed to adding more entities to the previous query. An exemplary set of previous and next queries may be "who won the Broncos game" and "I meant the college team." In this situation, the "I meant" feature clarifies the earlier entity in the previous query as opposed to adding more entities into the conversation. Another exemplary set of previous and next queries may be "Beethoven movies" and "I meant the dog." Similarly in this situation, the "I meant" feature clarifies the earlier entity in the previous query as opposed to adding more entities into the conversation. At step 1220, control circuitry 804 returns the updated second query.

If the type of conversation continuity is not a clarification type, at step 1220, control circuitry 804 returns the unmodified second query as the updated second query. In this situation, the type of conversation continuity is a no continuity type. For example, the next query may be independent of the previous query. An exemplary set of previous and next queries may be "action movies" and "comedy movies." In this situation, there is no conversation continuity between the previous and next queries.

It is contemplated that the steps or descriptions of FIG. 12 may be used with any other embodiment of this disclosure. In addition, the descriptions described in relation to the algorithm of FIG. 12 may be done in alternative orders or in parallel to further the purposes of this disclosure. For example, conditional statements and logical evaluations, such as those at 1204, 1208, and 1214, may be performed in any order or in parallel or simultaneously to reduce lag or increase the speed of the system or method. As a further example, in some embodiments several instances of types of conversation continuity may be evaluated in parallel, using multiple logical processor threads, or the algorithm may be enhanced by incorporating branch prediction. Furthermore, it should be noted that the process of FIG. 12 may be implemented on a combination of appropriately configured software and hardware, and that any of the devices or equipment discussed in relation to FIGS. 8-9 could be used to implement one or more portions of the process.

The processes discussed above are intended to be illustrative and not limiting. Though the processes and examples in this disclosure are discussed with respect to a pair of queries, the systems and methods described are equally applicable to more than two queries. The systems and methods may track continuity across multiple queries and maintain context where appropriate. Additionally, though the processes and examples in this disclosure are discussed with respect to an artificial neural network, the systems and methods described are equally applicable to multiple artificial neural networks or in combination with other machine learning techniques. One skilled in the art would appreciate that the steps of the processes discussed herein may be omitted, modified, combined, and/or rearranged, and any additional steps may be performed without departing from the scope of the invention.

More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for determining a type of conversation continuity in a natural language conversation comprising a first query and a second query to refine search results in response to the first query and the second query based on the type of conversation continuity, the method comprising:
   receiving, via a user input device, the first query from a user;
   retrieving, from a database, a first search result for the first query;
   generating for display, using control circuitry, the first search result;
   receiving, via the user input device, the second query from the user;
   determining, using control circuitry, a first token in the first query;
   determining, using the control circuitry, a second token in the second query;
   identifying, using the control circuitry, first entity data for the first token, wherein the first entity data includes:
   a first entity type for the first token,
   a first probability that the first entity type corresponds to the first token,
   a second entity type for the first token, and
   a second probability that the second entity type corresponds to the first token;
   identifying, using the control circuitry, second entity data for the second token, wherein the second entity data includes:

a third entity type for the second token,
a third probability that the third entity type corresponds to the second token,
a fourth entity type for the second token, and
a fourth probability that the fourth entity type corresponds to the second token;
transmitting a request including an indication of the first entity data and the second entity data for connections between the first entity data and the second entity data;
in response to the transmitted request, receiving one or more graph connections between the first entity data and the second entity data obtained by a search of a knowledge graph, the search based on the indication of the first entity data and the second entity data;
applying, using the control circuitry, the first token, the second token, the first entity data, the second entity data, and the one or more graph connections as inputs to an artificial neural network;
determining, using the control circuitry, an output from the artificial neural network that indicates the type of conversation continuity between the first query and the second query;
updating, using the control circuitry, the second query based on the type of conversation continuity;
retrieving, from the database, a second search result for the updated second query; and
generating for display, using control circuitry, the second search result.

2. The method of claim 1, wherein determining the first token in the first query comprises:
identifying, using the control circuitry, a first term and a second term in the first query;
determining, using the control circuitry, the first term is a filler word;
determining, using the control circuitry, the second term is not a filler word; and
assigning, using the control circuitry, the second term to be the first token.

3. The method of claim 1, wherein retrieving the one or more graph connections between the first entity data and the second entity data comprises:
retrieving, from the knowledge graph, a first graph connection between the first token being the first entity type and the second token being the third entity type;
retrieving, from the knowledge graph, a second graph connection between the first token being the second entity type and the second token being the third entity type;
retrieving, from the knowledge graph, a third graph connection between the first token being the first entity type and the second token being the fourth entity type; and
retrieving, from the knowledge graph, a fourth graph connection between the first token being the second entity type and the second token being the fourth entity type.

4. The method of claim 1, wherein applying the first token, the second token, the first entity data, the second entity data, and the one or more graph connections as inputs to the artificial neural network comprises:
multiplying, using the control circuitry, a first value for the first token with a first weight of an input layer of the artificial neural network;
multiplying, using the control circuitry, a second value for the second token with a second weight of the input layer of the artificial neural network;
multiplying, using the control circuitry, one or more values for the first entity data with one or more weights of the input layer of the artificial neural network;
multiplying, using the control circuitry, one or more values for the second entity data with one or more weights of the input layer of the artificial neural network; and
multiplying, using the control circuitry, one or more values for the one or more graph connections with one or more weights of the input layer of the artificial neural network.

5. The method of claim 1, wherein determining the output from the artificial neural network that indicates the type of conversation continuity between the first query and the second query comprises:
multiplying, using the control circuitry, one or more inputs to a hidden layer in the artificial neural network with corresponding one or more weights in the hidden layer; and
adding, using the control circuitry, resulting values from the multiplying to determine the output value.

6. The method of claim 1, wherein updating the second query based on the type of conversation continuity comprises:
identifying, using the control circuitry, the type of conversation continuity to be a merge type;
merging, using the control circuitry, the second query with the first query based on identifying the type of conversation continuity to be the merge type.

7. The method of claim 1, wherein updating the second query based on the type of conversation continuity comprises:
identifying, using the control circuitry, the type of conversation continuity to be a replacement type; and
based on identifying the type of conversation continuity to be the replacement type:
determining, using the control circuitry, a portion of the second query that replaces a portion of the first query; and
determining, using the control circuitry, the second query to be the first query with the portion of the first query replaced with the portion of the second query.

8. The method of claim 1, wherein updating the second query based on the type of conversation continuity comprises:
identifying, using the control circuitry, the type of conversation continuity to be a clarification type; and
based on identifying the type of conversation continuity to be the clarification type:
determining, using the control circuitry, an alternative entity type for the first token in the first query based on the second query; and
determining, using the control circuitry, the second query to be the first query with the first token being the alternative entity type.

9. The method of claim 1, wherein updating the second query based on the type of conversation continuity comprises:
identifying, using the control circuitry, the type of conversation continuity to be a no continuity type; and
based on identifying the type of conversation continuity to be the no continuity type, assigning, using the control circuitry, the second query to be the updated second query.

10. The method of claim 1, further comprising:
- receiving, from the user input device, an indication that the determined type of conversation continuity is incorrect and a corrected type of conversation continuity; and
- updating, using the control circuitry, one or more weights in the artificial neural network based on the corrected type of conversation continuity.

11. A system for determining a type of conversation continuity in a natural language conversation comprising a first query and a second query to refine search results in response to the first query and the second query based on the type of conversation continuity, the system comprising:
- a memory storing at least one of a database and a knowledge graph;
- a user input device in communication with control circuitry;
- the control circuitry configured to:
  - receive, via the user input device, the first query from a user;
  - retrieve, from the database, a first search result for the first query;
  - generate for display the first search result;
  - receive, via the user input device, the second query from the user;
  - determine a first token in the first query;
  - determine a second token in the second query;
  - identify first entity data for the first token, wherein the first entity data includes:
    - a first entity type for the first token,
    - a first probability that the first entity type corresponds to the first token,
    - a second entity type for the first token, and
    - a second probability that the second entity type corresponds to the first token;
  - identify second entity data for the second token, wherein the second entity data includes:
    - a third entity type for the second token,
    - a third probability that the third entity type corresponds to the second token,
    - a fourth entity type for the second token, and
    - a fourth probability that the fourth entity type corresponds to the second token;
  - transmit a request including an indication of the first entity data and the second entity data for connections between the first entity data and the second entity data;
  - in response to the transmitted request, receive one or more graph connections between the first entity data and the second entity data obtained by a search of a knowledge graph, the search based on the indication of the first entity data and the second entity data;
  - apply the first token, the second token, the first entity data, the second entity data, and the one or more graph connections as inputs to an artificial neural network;
  - determine an output from the artificial neural network that indicates the type of conversation continuity between the first query and the second query;
  - update the second query based on the type of conversation continuity;
  - retrieve, from the database, a second search result for the updated second query; and
  - generate for display the second search result.

12. The system of claim 11, wherein the control circuitry configured to determine the first token in the first query comprises the control circuitry configured to:
- identify a first term and a second term in the first query;
- determine the first term is a filler word;
- determine the second term is not a filler word; and
- assign the second term to be the first token.

13. The system of claim 11, wherein the control circuitry configured to retrieve the one or more graph connections between the first entity data and the second entity data comprises the control circuitry configured to:
- retrieve, from the knowledge graph, a first graph connection between the first token being the first entity type and the second token being the third entity type;
- retrieve, from the knowledge graph, a second graph connection between the first token being the second entity type and the second token being the third entity type;
- retrieve, from the knowledge graph, a third graph connection between the first token being the first entity type and the second token being the fourth entity type; and
- retrieve, from the knowledge graph, a fourth graph connection between the first token being the second entity type and the second token being the fourth entity type.

14. The system of claim 11, wherein the control circuitry configured to apply the first token, the second token, the first entity data, the second entity data, and the one or more graph connections as inputs to the artificial neural network comprises the control circuitry configured to:
- multiply a first value for the first token with a first weight of an input layer of the artificial neural network;
- multiply a second value for the second token with a second weight of the input layer of the artificial neural network;
- multiply one or more values for the first entity data with one or more weights of the input layer of the artificial neural network;
- multiply one or more values for the second entity data with one or more weights of the input layer of the artificial neural network; and
- multiply one or more values for the one or more graph connections with one or more weights of the input layer of the artificial neural network.

15. The system of claim 11, wherein the control circuitry configured to determine the output from the artificial neural network that indicates the type of conversation continuity between the first query and the second query comprises the control circuitry configured to:
- multiply one or more inputs to a hidden layer in the artificial neural network with corresponding one or more weights in the hidden layer; and
- add resulting values from the multiplying to determine the output value.

16. The system of claim 11, wherein the control circuitry configured to updating the second query based on the type of conversation continuity comprises the control circuitry configured to:
- identify the type of conversation continuity to be a merge type;
- merge the second query with the first query based on identifying the type of conversation continuity to be the merge type.

17. The system of claim 11, wherein the control circuitry configured to update the second query based on the type of conversation continuity comprises the control circuitry configured to:
- identify the type of conversation continuity to be a replacement type; and based on identifying the type of conversation continuity to
be the replacement type:
  determine a portion of the second query that replaces a
    portion of the first query; and
  determine the second query to be the first query with
    the portion of the first query replaced with the
    portion of the second query.

18. The system of claim 11, wherein the control circuitry configured to update the second query based on the type of conversation continuity comprises the control circuitry configured to:
  identify the type of conversation continuity to be a clarification type; and
  based on identifying the type of conversation continuity to be the clarification type:
    determine an alternative entity type for the first token in the first query based on the second query; and
    determine the second query to be the first query with the first token being the alternative entity type.

19. The system of claim 11, wherein the control circuitry configured to update the second query based on the type of conversation continuity comprises the control circuitry configured to:
  identify the type of conversation continuity to be a no continuity type; and
  based on identifying the type of conversation continuity to be the no continuity type, assign the second query to be the updated second query.

20. The system of claim 11, wherein the control circuitry is further configured to:
  receive, from the user input device, an indication that the determined type of conversation continuity is incorrect and a corrected type of conversation continuity; and
  update one or more weights in the artificial neural network based on the corrected type of conversation continuity.

* * * * *

UNITED STATES PATENT AND TRADEMARK OFFICE
CERTIFICATE OF CORRECTION

PATENT NO. : 9,858,265 B1
APPLICATION NO. : 15/176516
DATED : January 2, 2018
INVENTOR(S) : Ahmed Nizam Mohaideen P et al.

Page 1 of 1

It is certified that error appears in the above-identified patent and that said Letters Patent is hereby corrected as shown below:

In the Claims

Claim 6, at Column 30, Line number 27, please insert -- and -- after ";".

Claim 16, at Column 32, Line number 58, please insert -- and -- after ";".

Signed and Sealed this
Fourth Day of June, 2019

Andrei Iancu
*Director of the United States Patent and Trademark Office*